United States Patent
Krithivasan

(10) Patent No.: US 8,505,572 B2
(45) Date of Patent: Aug. 13, 2013

(54) PRESSURE RELIEF VALVE

(75) Inventor: Rajesh Krithivasan, Pineville, LA (US)

(73) Assignee: Dresser Inc., Addison, TX (US)

( * ) Notice: Subject to any disclaimer, the term of this patent is extended or adjusted under 35 U.S.C. 154(b) by 211 days.

(21) Appl. No.: 12/981,028

(22) Filed: Dec. 29, 2010

(65) Prior Publication Data
US 2012/0167992 A1 Jul. 5, 2012

(51) Int. Cl.
*F16K 17/20* (2006.01)

(52) U.S. Cl.
USPC .......................................... 137/477; 251/333

(58) Field of Classification Search
USPC ................ 137/469, 477; 251/333, 334, 356, 251/359
See application file for complete search history.

(56) References Cited

U.S. PATENT DOCUMENTS

| | | | | |
|---|---|---|---|---|
| 1,671,139 A | * | 5/1928 | Wilson | 251/334 |
| 1,671,140 A | * | 5/1928 | Wilson | 251/334 |
| 1,699,217 A | * | 1/1929 | Wilson | 251/334 |
| 2,643,671 A | | 6/1953 | Dayton | |
| 3,141,474 A | * | 7/1964 | Gentzel | 137/469 |
| 3,164,364 A | * | 1/1965 | McColl | 251/334 |
| 3,174,718 A | | 3/1965 | Bowen et al. | |
| 3,433,250 A | | 3/1969 | Hagihara | |
| 3,450,385 A | | 6/1969 | Paptzun | |
| 3,902,695 A | | 9/1975 | Worwetz | |
| 4,130,130 A | | 12/1978 | Stewart et al. | |
| 4,357,956 A | | 11/1982 | Anselmann et al. | |
| 4,480,660 A | * | 11/1984 | Bayart et al. | 137/478 |
| 4,481,974 A | | 11/1984 | Schmitt et al. | |
| 4,595,033 A | | 6/1986 | Walsh, Jr. | |
| 4,708,164 A | * | 11/1987 | Scallan | 137/476 |
| 4,757,974 A | * | 7/1988 | Ward et al. | 251/356 |
| 4,858,642 A | * | 8/1989 | Fain, Jr. | 137/474 |
| 4,932,434 A | * | 6/1990 | Taylor | 137/469 |
| 5,046,524 A | | 9/1991 | Crichton, Jr. | |
| 5,224,511 A | | 7/1993 | Schnettler | |
| 5,370,151 A | | 12/1994 | Smart | |
| 5,515,884 A | | 5/1996 | Danzy et al. | |
| 5,791,373 A | * | 8/1998 | Adams | 137/469 |
| 2009/0194174 A1 | * | 8/2009 | Morgan et al. | 137/469 |
| 2011/0284092 A1 | * | 11/2011 | Spencer et al. | 137/14 |

FOREIGN PATENT DOCUMENTS

WO 91/14907 A1 10/1991

OTHER PUBLICATIONS

PCT Search Report and Written Opinion dated Mar. 19, 2012 from corresponding Application No. PCT/US2011/065087.
*Dresser Consolidated Best Under Pressure 1900/P Series Safety Relief Valve*, www.dresser.com, 1900/P Oct. 2008-CO, http://www.dresserconsolidated.com/documents/SafetyReliefValvePartsCatalog/SRV_1900P_low.pdf.

(Continued)

*Primary Examiner* — John Rivell
*Assistant Examiner* — Umashankar Venkatesan
(74) *Attorney, Agent, or Firm* — Hiscock & Barclay LLP

(57) ABSTRACT

A pressure relief valve for cryogenic service includes: a fluid inlet and a fluid outlet; a nozzle disposed within the fluid inlet, said nozzle having a nozzle groove radially formed on an exterior cylindrical surface of the nozzle and an outwardly disposed ledge having a lower ledge surface comprising a portion of an exterior surface of the nozzle groove and an upper ledge surface comprising a seat; a substantially cylindrical closure disc with a lower portion including a groove formed on an exterior radial surface of the cylindrical body, an outwardly disposed lip having an upper surface comprising a portion of an interior surface of the groove, said lip of the closure disc having a lower closure surface. The lip of the closure disc being adapted to deflect downward and inward in response to a cryogenic thermal gradient applied across the lip.

35 Claims, 6 Drawing Sheets

(56) References Cited

OTHER PUBLICATIONS

*Consolidated® Installation and Start-Up Instructions Consolidated Safety Relief Valve Type 1900*, Industrial Valve Operation, Dresser Valve and Controls Division, CON-2 ISI, Issued Apr. 1996.
*Consolidated® Installation and Maintenance Manual Type 1900/P Series*, Dresser Flow Control, CON-3, Revised May 2001, http://www.dresserconsolidated.com/documents/SafetyReliefValvePartsCatalog/1900P_SRV_MMcurrent.pdf.
*Consolidated® Installation and Start-Up Instructions Consolidated® Safety Valve Type 1700-2-S and 1700-3-S*, Industrial Valve Operation, Dresser Valve and Controls Division, CON-[ ]SI, Issued Sep. 1993.
"Type 1900 Universal Media Process Safety Relief Valve": [online], published at least as early as Dec. 28, 2010, [Retrieved on Jan. 3, 2011]; Retrieved from the Internet URL: http://www.dresserconsolidated.com/index.cfm/go/product-detail/product/type_1900_universal_media_SRV/.
"Introducing a Winning Combination The new Dresser Consolidated® Type 1900 Series Universal Media": [online], published at least as early as Dec. 28, 2010, [Retrieved on Jan. 3, 2011]; Retrieved from the Internet URL: http://1900universalmedia.dresser.com/.
*Dresser Consolidated Best Under Pressure 1900 Series Safety Relief Valve*, www.dresser.com, 1900 Oct. 2008-CO, http://www.dresserconsolidated.com/documents/SafetyReliefValvePartsCatalog/SRV_1900_low.pdf.
"Crosby" Tyco Flow Control, 2009, 66 pages.
Relief Valve from Wikipedia, http://en.wikipedia.org/wiki/Relief_valve, May 5, 2010, 4 pages.
"Pressure Relief Valves" Valve Selection Handbook, pp. 169-213.
"Type 1900/P Process Safety Relief Valve": [online], published at least as early as Dec. 28, 2010, [Retrieved on Jan. 3, 2011]; Retrieved from the Internet URL: http://www.dresserconsolidated.com/index.cfm/go/product-detail/product/type-1900P-safety-relief-valve/.
"1700 Maxiflow Steam Safety Valve": [online], published at least as early as Dec. 28, 2010, [Retrieved on Jan. 11, 2011]; Retrieved from the Internet URL: http://www.dresserconsolidated.com/index.cfm/go/product/1700-maxiflow-steam-safety-valve/.

* cited by examiner

PRESSURE RELIEF VALVE

TECHNICAL BACKGROUND

This disclosure relates to pressure relief valves, and more particularly, to pressure relief valves suitable for use in cryogenic applications.

BACKGROUND

Typically, a pressure relief valve may be used to control or limit pressure in a system or vessel, which can build up by, for example, a process upset, instrument or equipment failure, or fire. In some instances, pressure relief valves may be used in a chemical processing plant that distills natural gas into pure methane, e.g., a "methanizer." The process eliminates impurities like toluene and ethane from the natural gas to provide pure methane. The distillation is done by the adiabatic expansion of natural gas. Pressurized natural gas is made to work on compressors. The reduction in pressure to perform work is reflected by a drop in temperature. At different stages of temperature drops, the different compounds, such as toluene and ethane, start distilling and are collected in separate containers. Since methane has the lowest atomic weight in the gases comprising natural gas, pure methane results at the final stage of distillation.

The process fluid coming out of the methanizer (e.g., methane) is in liquid form and may also be used elsewhere in the plant or sold as liquefied natural gas ("LNG"). A safety, or pressure, relief valve may be used to protect against overpressures at the methanizer output, or any other location within the piping system. LNG facilities may operate in the range of −150 degrees F. to −450 degrees F.

In some instances, premature and/or undesirable leaks from prior art pressure relief valves may occur due in part to a difference in temperature between a fluid flowing to an inlet of the pressure relief valve and an ambient condition within the valve. Such a leak may begin as a microleak but, without attention, may increase in flow to a macroleak, thereby preventing the valve from maintaining a desired pressure-seal in the system. Very large temperature differences may occur with valves in cryogenic service. In some instances, the temperature differences between the fluid flowing to the valve inlet and the ambient valve condition may be in the range of 250 degrees F. Referring briefly to FIGS. 7A and 7B, sectional views of a conventional prior art disc 700 of a prior art pressure relief valve used in a high temperature (e.g., steam) application is illustrated. Such prior art discs have been used in high temperature applications for over 50 years. The disc 700 includes lips 705 extending from a bottom surface of the disc 700 and directed towards a centerline of the disc 700. FIG. 6 shows the disc 700 in a non-operational state, i.e., with no high temperature fluid flowing through the valve in which the disc 700 is placed. Upon introduction of the high temperature fluid to the valve and opening of the valve, a temperature gradient occurs across the lips 705 (e.g., high temperature at an inlet of the valve compared to ambient temperature at an outlet of the valve). FIG. 7B illustrates a deflection of the lips 705 due to the temperature gradient and thermal characteristics of the disc 700. As illustrated, due to a high temperature fluid, the lips 705 deflect in the direction "X." Such deflection may help seal the valve (i.e., cause the disc to seat on a nozzle in the valve) to leaks, such as microleaks and/or macroleaks.

In some instances, a prior art pressure relief valve disc such as disc 135 (as shown in FIGS. 1A, 1B and 1C) experiences micro or macroleaks when such a valve is placed in cryogenic service. Such prior art valve discs may also experience galling. In some cases, galling is a form of surface damage on an interior surface of the pressure relief valve arising between sliding solids. Galling is, typically, distinct from damage caused by microscopic (usually localized) roughening and creation of protrusions (i.e., lumps) above the interior surface. Galling may contribute or exacerbate the leaks experienced by the pressure relief valve due to the temperature difference experienced in cryogenic service.

Therefore, there has been long felt and unmet need for a unique design for discs for relief valves used in cryogenic service that solve the problems discussed above.

SUMMARY

In some implementations, the PRV of the present disclosure includes a disc-nozzle combination that minimizes and/or prevents process fluid leakage therethrough by deflection of portions of the disc and/or nozzle due to a thermal gradient between the process fluid temperature and the ambient condition. For example, in some implementations, the disc of the PRV may include a groove disposed on an outer circumferential surface of the disc, thereby forming a protrusion (e.g., a lip) that deflects axially (rather than or in addition to radially) in order to sealingly contact the nozzle (as explained more fully below). Further, in some implementations, the nozzle may include a notch disposed in an exterior circumferential surface of the nozzle to form a protrusion (e.g., a ledge) that, in response to a thermal gradient between the process fluid and the ambient condition on the outlet of the PRV, said ledge deflects to sealingly contact the disc and minimize and/or prevent leaks.

Various implementations of a pressure relief valve (PRV) according to the present disclosure meet long felt but unmet needs for valves in cryogenic service. PRVs of the present disclosure may include one or more of the following features. For example, the PRV may help prevent or minimize leaks during cryogenic service of the valve. In some implementations, the PRV may help prevent or minimize such leaks subsequent to a first opening (or "pop") of the valve in use in cryogenic service. As another example, the PRV may be used in a wide variety of cryogenic services and fluid temperatures while minimizing and/or preventing leaks through the valve caused at least in part by a temperature difference between the process fluid circulating through the valve and an ambient temperature condition in the valve (e.g., temperature on an outlet side of the PRV). As another example, the PRV may maximize set tightness during cryogenic service of the valve. The PRV may also utilize thermal characteristics of a material used for a valve disk and/or nozzle to minimize and/or prevent leaks of the valve during cryogenic service. For instance, the PRV may utilize a material deflection caused by a thermal gradient across the disc and/or nozzle to minimize and/or prevent leaks between the disk and nozzle. In sonic cases, the PRV may utilize the thermal characteristics with a geometry of the disc and/or nozzle in order to minimize and/or prevent leaks between the disc and nozzle. For example, one or more components of the PRV may axially deflect, rather than radially deflect, to sealingly contact and close the PRV to fluid flow therethrough in order to minimize and/or prevent leaks of the process fluid through the PRV.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

Figure 1A:
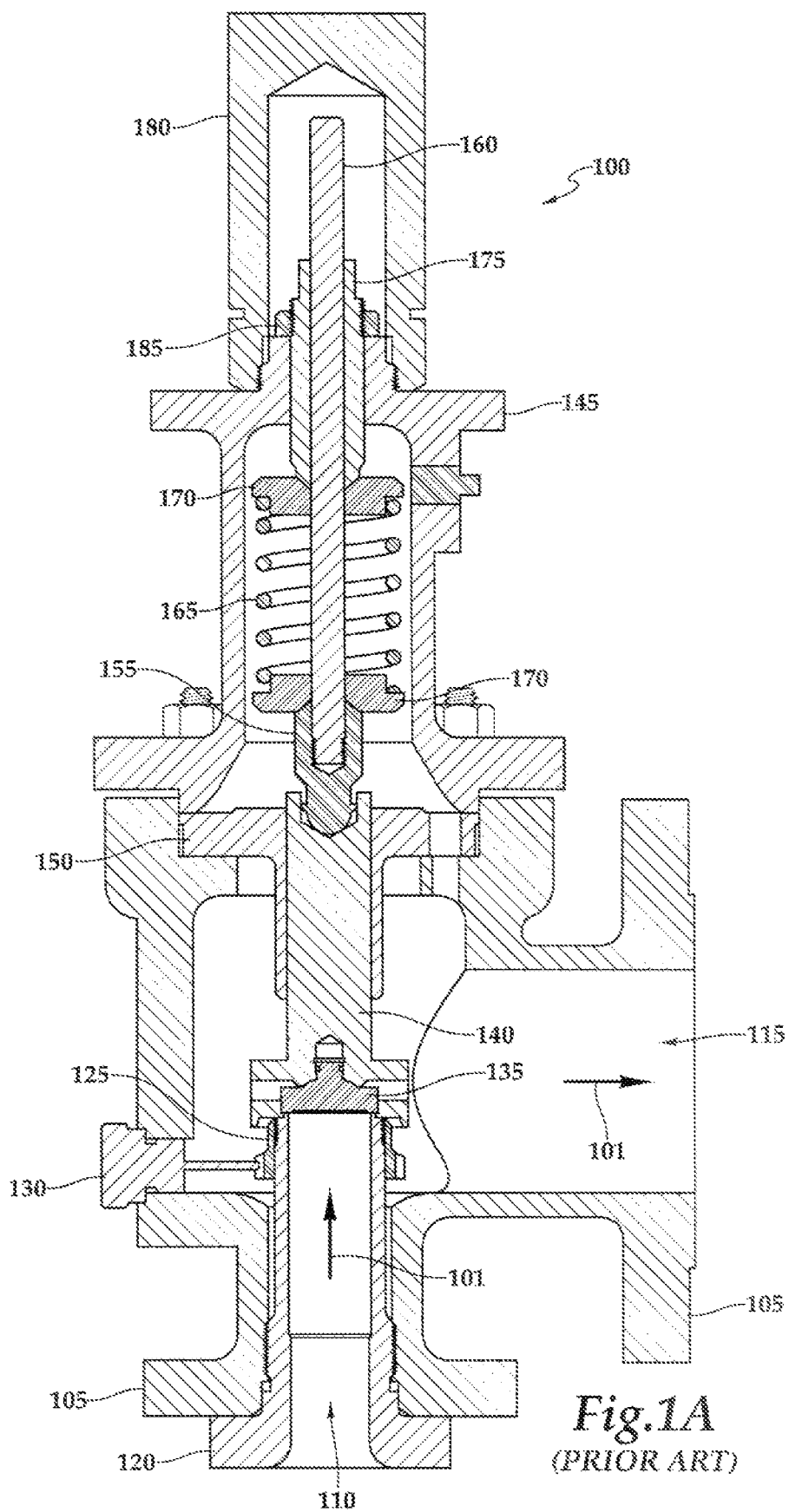
FIG. 1A illustrates a sectional view of a prior art pressure relief valve (PRV) with a prior art cryogenic disc.

Reference is now made to the drawings wherein like reference characters indicate like or similar parts through the figures.

A pressure relief valve (PRV) according to the present disclosure may include a disc, a disc holder, a nozzle, and a mass-spring-damper system that allows for a fluid (e.g., gas, liquid, or multiphase fluid) within a system, such as a piping system or pressure vessel, to be relieved by operation of the PRV when the fluidic, pressure of the fluid exceeds a predetermined threshold. In some embodiments, the PRV may be used for cryogenic service, where a process fluid circulated to the PRV is at a lower temperature than an ambient condition at an outlet of the PRV. "Cryogenic service," when used in the present disclosure, refers to applications in which a temperature of the process fluid circulated to the PRV is within one of the following temperature ranges: −21 to −75 F (e.g., propane as the process fluid); −76 to −150 F (e.g., ethylene as the process fluid); and −151 to −450 F (e.g., liquefied natural gas "LNG", liquid nitrogen, liquid hydrogen or liquid helium as the process fluid). Alternatively, the term "cryogenic service" may refer to other temperature ranges for a combination of the aforementioned process fluids and other process fluid, such as: 0 to −50° F.; −50 to −150° F.; and −150 to −450° F.

Figure 1B:
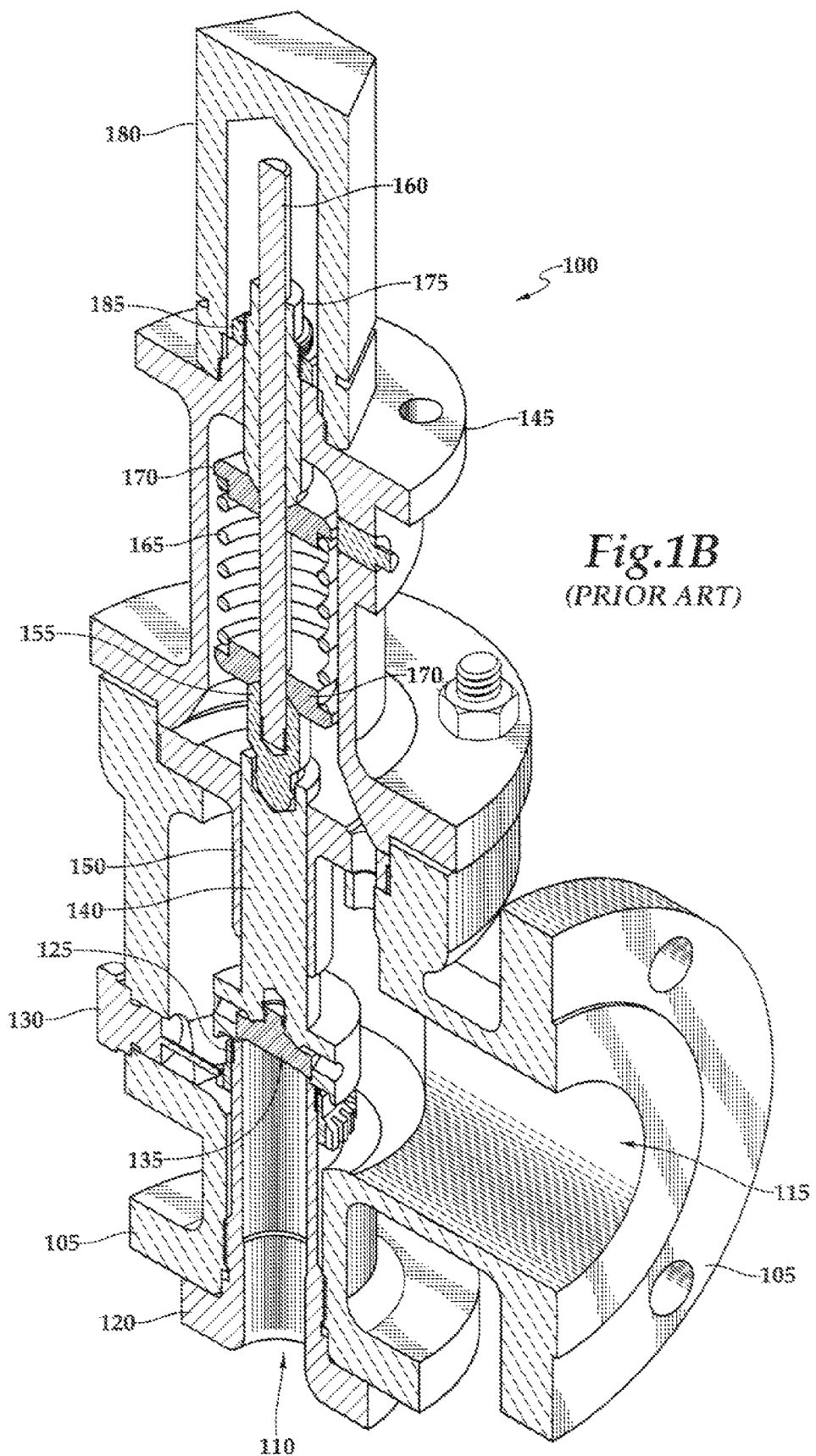
FIG. 1B illustrates a perspective cross-sectional view of the PRV of FIG. 1A.
Figures 1C, 1D:
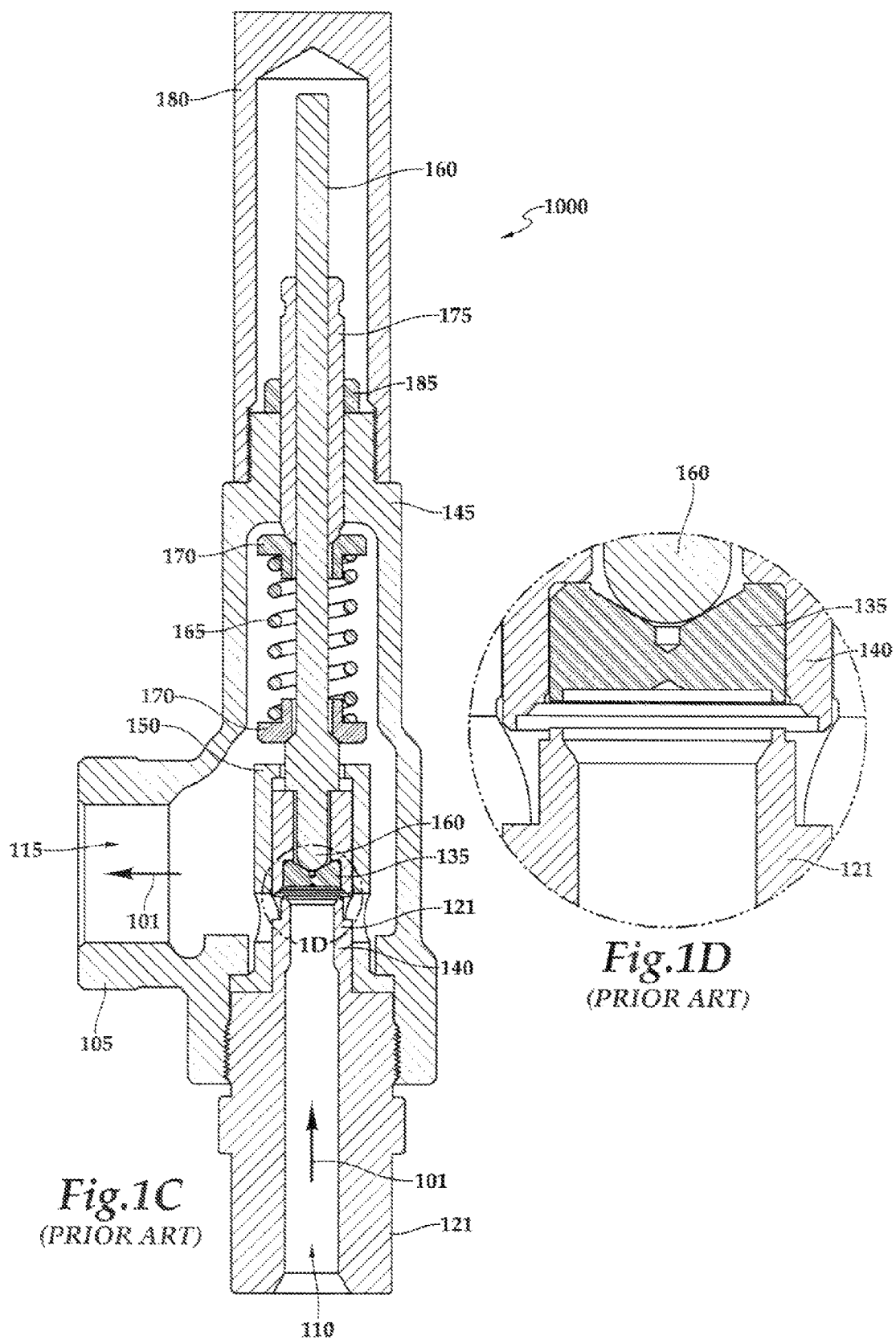
FIG. 1C illustrates an alternate embodiment of the PRV of FIG. 1A, wherein the nozzle of the PRV is integral with a base of the PRV.
FIG. 1D illustrates an enlarged portion of FIG. 1C.

FIGS. 1A-B illustrate sectional views of one implementation of a prior art pressure relief valve (PRV) 100. FIG. 1C illustrates a sectional view of another implementation of a pressure relief valve (PRV) 1000 having an alternative nozzle 121 integral with the base 105. Referring now to FIGS. 1A, 1B and 1C, PRV 100 (and 1000; hereinafter referred to for convenience as PRV 100) receives a fluid 101 (e.g., gas or liquid or a multiphase fluid) at and through an inlet 110 and directs the fluid 101 to and through an outlet 115 of the PRV 100 in order to relieve a pressure within a system. For example, the PRV 100 is typically in fluid communication with components, such as pressure vessels, heat exchangers, mechanical equipment (e.g., compressors, turbines, and others) within a piping or conduit system and may be used to control or limit a pressure in such a system, including such vessels, heat exchangers, and/or equipment, which can build up by a process upset, instrument or equipment failure, fire, or other incident. Pressure is relieved through the operation of PRV 100 by allowing the pressurized fluid to flow from the inlet 110 through the outlet 115 at a predetermined pressure set point. For instance, the PRV 100 may be designed or set to open at a predetermined set pressure to protect pressure vessels and other equipment from being subjected to pressures that exceed their design limits.

The process fluid 101 may be one of a number of fluids utilized in cryogenic service. For example, the fluid 101 may be methane, propane, ethylene, LNG, liquid nitrogen, or any combination thereof or other fluid. In any event, a temperature of the fluid 101 flowing through the inlet 110 may be substantially lower than an ambient temperature condition at the outlet 115. The ambient temperature, typically, is between 50-90° F.

PRV 100 includes a base 105 at least partially enclosing a nozzle 120 (or, alternatively, PRV 1000 includes a base 105 with an integral nozzle 121 (see FIG. 1C)), and enclosing a disc 135, and a disc holder 140, and optionally an adjusting ring 125. The base 105 receives (e.g., threadingly or welded or integral) the nozzle 120 at the inlet 110 of the PRV 100 and, in the illustrated embodiment FIGS. 1A and 1B, includes a flanged connection at the outlet 115. The nozzle 120 (or 121), generally, may be a pressure containing component in constant contact with the fluid 101 in both the open and closed positions of PRV 100. (Note: The nozzle 120 or 121 may sometimes be referred to in the art as a seat or seat bushing.)

The base 105 may also include a flanged connection at the inlet 110 or, alternatively, may include other connection mechanisms (e.g., grooved pipe connection, butt weld, or otherwise) at one or both of the inlet 110 and outlet 115. In some embodiments, a portion of the base 105 adjacent the outlet 115 may have a lower pressure rating than a portion of the base 105 adjacent the inlet 110 because of, for example, a decrease in fluidic pressure of the fluid 101 at the outlet 115 relative to the inlet 110.

PRV 100 also includes a cap 180 and a bonnet 145 enclosing (at least partially) a spindle 160, which is threadingly engaged through one or more of a lock nut 185, an adjusting screw 175, spring washers 170, a spring 165, and a spindle head 155. Generally, the bonnet 145 is mechanically coupled (e.g., by one or more bolts and locking nuts or by threading) at one end to the base 105 while the cap 180 is mechanically coupled (e.g., threadingly) to the bonnet 145 at a second end. The adjusting screw 175, rigidly coupled to the bonnet 145 via the lock nut 185, guidingly allows the spindle 160 to oscillate vertically within the cap 180 and bonnet 145 during operation of the PRV 100.

The PRV 100 also includes a guide 150 that receives at least a portion of the disc holder 140 therethrough. Typically, the disc 135, disc holder 140, spring washer (or washers) 170, spindle 160, spindle head 155, and spring 165 comprise a "mass-spring-damper" system that works to respond to fluidic forces applied by the fluid 101 as it contacts the disc 135 through the nozzle 120. The disc holder 140 includes a receiving aperture at a top end to receivingly engage the spindle head 155 such that force may be transmitted from the disc holder 140 to the spindle head 155 and, thus, to the spring washers 170 and spring 165. For example, when an upward fluidic force greater than the spring force of the spring 165 is applied to the disc 135 (and is thus transmitted through the disc holder 140, the spindle head 155, and the spring washer 170 to the spring 165), the spring 165 may be compressed, thereby urging the spindle 160 upward through the adjusting screw 175. Likewise, as the spring force of the spring 165 is greater than the fluidic force, the spring 165 expands, thereby urging the spindle 160 (and spindle head 155, disc holder 140, and disc 135) downward.

In the embodiment of the PRV 100 illustrated in FIGS. 1A and 1B, an adjusting ring 125 is engaged (e.g., threadingly) with a top portion of the nozzle 120. Typically, adjusting ring 125 may be adjusted upward and/or downward on the nozzle 120 by threading or unthreading the ring 125 on the nozzle 120. By adjusting the location (i.e., height) of the adjusting ring 125 relative to a top end of the nozzle 120, blowdown, or reseating pressure, may also be adjusted. For example, when the adjusting ring 125 is moved upward, blowdown is increased thereby lowering the reseating pressure. Alternatively, when the adjusting ring 125 is moved downward, the blowdown is decreased, thereby raising the reseating pressure. In some embodiments, the adjusting ring 125, and therefore the PRV 100, may be preset at a predetermined position prior to putting the PRV 100 in service. In such embodiments, presetting may reduce the necessity of "popping" (i.e., applying the set pressure to the PRV 100, such that significant lift of the disc and/or disc holder is obtained) the PRV 100 in service to ascertain that the adjusting ring 125 has been set properly for attaining the necessary lift and relieving capacity.

In the embodiment illustrated in FIGS. 1A and 1B, a ring pin 130 extends from a location external to the base 105, through the base 105, and operates to secure the adjusting ring 125 at a certain location (e.g., vertical position) on the nozzle 120. When the ring pin 130 is rotatably removed or partially removed from the base 105, the adjusting ring 125 may be adjusted (i.e., moved upward or downward). For example, the adjusting ring 125 may have multiple vertical grooves arranged circumferentially around an outer surface of the ring 125. In some embodiments, the adjusting ring 125 has 30 grooves; alternatively, the adjusting ring 125 may have fewer or more grooves (e.g., 16, 42, or other number of grooves). The ring pin 130 includes a pointed tip configured to fit within a groove (e.g., approximately halfway between peaks and a valley between two grooves) and substantially prevents the adjusting ring 125 from vertical movement along the nozzle 120 through rotation of the adjusting ring 125 around the nozzle 120. For example, in one implementation of the adjusting ring 125 including 30 grooves, adjusting the ring pin 130 between adjacent grooves may allow for approximately 12 degrees of rotation of the adjusting ring 125, which translates to approximately 2/1000 inch vertical movement of the adjusting ring 125 along the nozzle 120.

Figure 2:
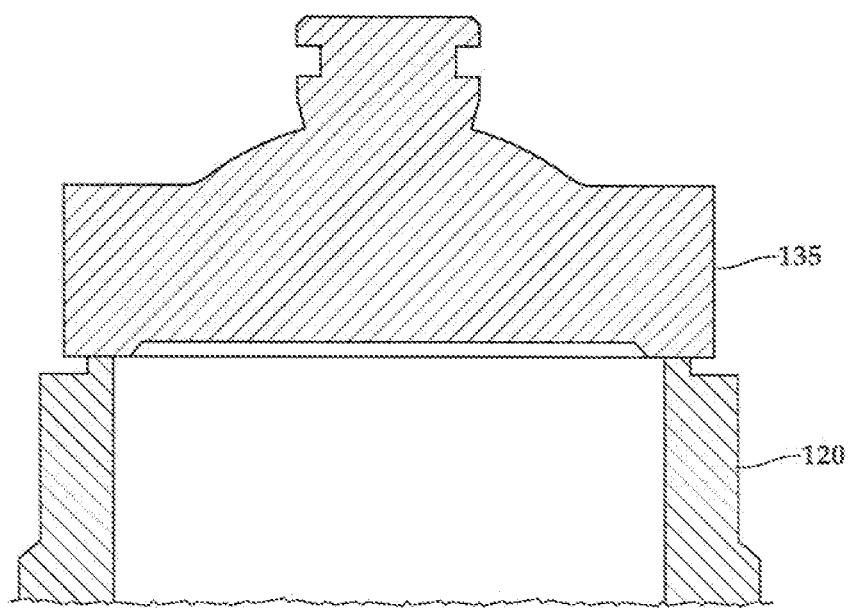
FIG. 2 illustrates an enlarged cross-sectional view of the prior art disc of FIGS. 1A, 1B and 1C used for cryogenic service.

As illustrated in FIGS. 1A and 1B, the PRV 100 is in a "closed" state, where the disc 135 is "seated" on the nozzle 120. (In a like manner, PRV 1000 is illustrated in a closed state in FIG. 1C and FIG. 1D.) In the closed state, flow of the fluid 101 may be prevented or substantially prevented from the inlet 110 to the outlet 115 of the PRV 100. In some instances, however, such as when the PRV 100 is urged from an open state to the closed state (e.g., shown in FIG. 2), the PRV 100 may experience a leak such that a small flow of fluid 101 occurs from the inlet 110 to the outlet 115. In certain instances, such as during cryogenic service of the PRV 100, a thermal gradient may occur across the disc 135 and/or nozzle 120. For example, the thermal gradient may occur across a portion of the disc 135 that contacts the nozzle 120, e.g., a "seat." Such a thermal gradient across a disc and/or nozzle may cause a thermal deflection of one or both of these components, thereby exacerbating the leak (or preventing the disc from seating on the nozzle). This thermal deflection may, for example, cause a radial deflection of the disc (e.g., radially outward from a vertical centerline of the valve), thereby increasing a gap between the disc and nozzle. The gap may allow fluid 101 to flow to the outlet 115 during a leak.

Figure 4:
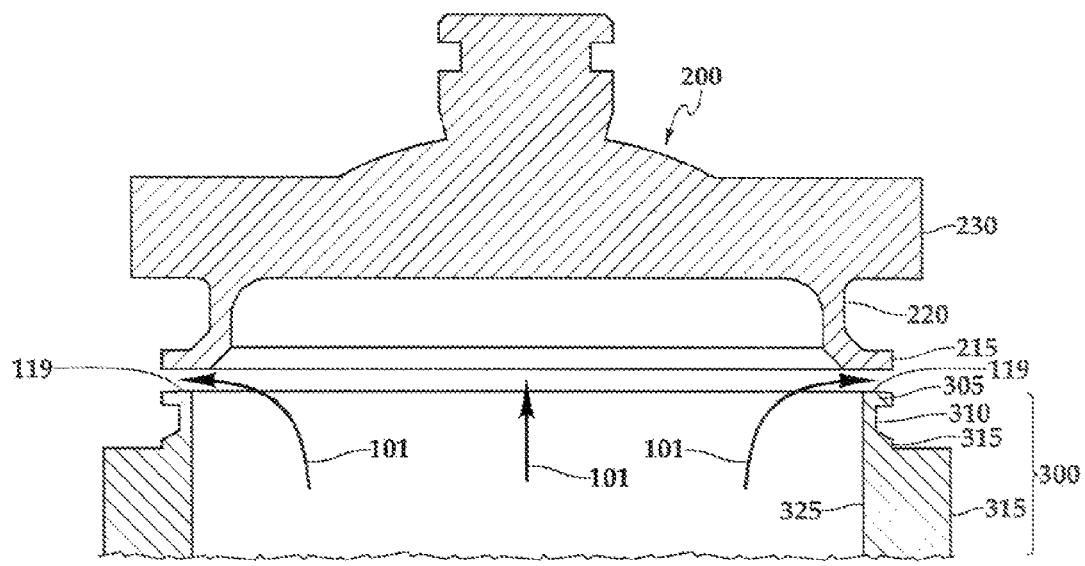
FIG. 4 illustrates an enlarged sectional view of the disc of FIGS. 3A and 3B and a nozzle combination used in one implementation of a PRV in accordance with the present disclosure.

In order to solve problems with leakage in PRVs which use prior art discs, applicant has invented and discloses herein a disc 200 and/or nozzle 300 for use in the prior art PRV 100 to thermally deflect in an axial direction toward each other (i.e., vertically in parallel with a centerline 10 defined through the PRV 100 as shown in FIG. 4). For example, in some embodiments, as explained below, at least a portion of the disc 200 may axially deflect towards a seat 119 of the nozzle 300, thereby closing or substantially closing the PRV 100 to prevent or substantially prevent flow of the fluid 101 from the inlet 110 to the outlet 115 in cryogenic service. Further, in some embodiments, a portion of the nozzle 300 may deflect axially towards the disc 300 to assist in closing the PRV 100.

Figure 3A:
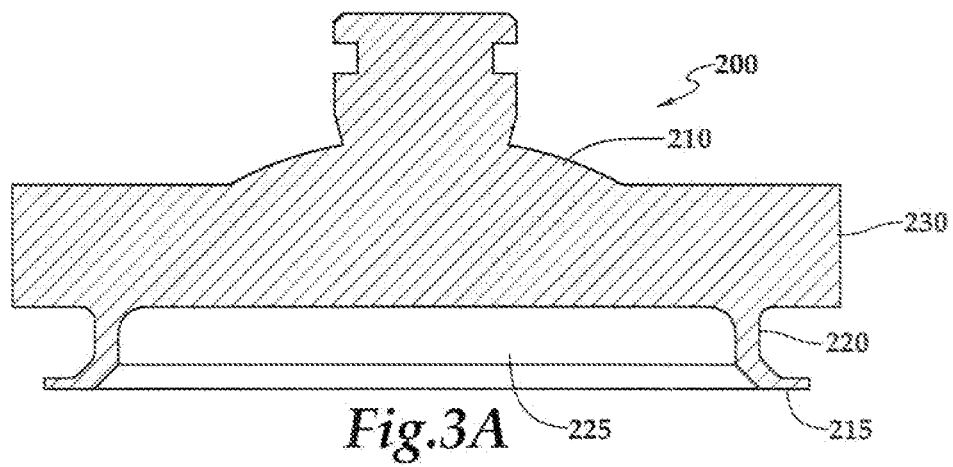
FIGS. 3A and 3B illustrate a cross-sectional view of a disc used in one implementation of a PRV in accordance with the present disclosure.
Figure 3B:
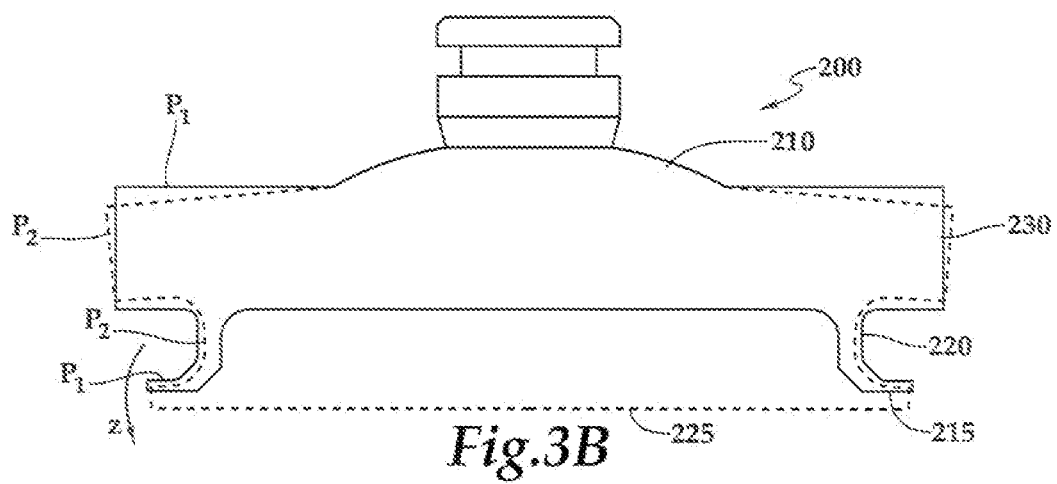

FIGS. 3A and 3B illustrate a sectional view of the disc 200 that may be used in the PRV 100 of the present disclosure. The disc 200 has a body 210, a lip 215, a groove ring 220, and a groove cut 225. As shown particularly in FIG. 3B, in some embodiments, at least a portion of the disc 200 may axially deflect in the illustrated direction "Z" in response to a thermal gradient across the lip 215. For example, when the disc 200 is utilized in the PRV 100 during cryogenic service, a thermal gradient between the inlet 110 and the outlet 120 of the PRV 100 may occur across the lip 215 of the disc 200. The thermal gradient may, in some embodiments, be dependent on the difference between a temperature of the fluid 101 at the inlet 110 of the PRV and an ambient temperature at the outlet 115 of the PRV. As illustrated in FIG. 3B, position $P_1$ illustrates the configuration of an embodiment of the disc 200 when not deflected due to a thermal gradient. Position $P_2$ illustrates a deflected position due to a thermal gradient across the disc 200. Dotted lines illustrate the approximated deflected position $P_2$. The amount of deflection will vary depending on the thermal gradient and the configuration of the disc 200.

In the illustrated embodiment, the groove ring 220 may be a circumferential recess in the body 210 around an exterior, radial surface 230 of the disc 200. Further, in the illustrated embodiment of the disc 200, the groove cut 225 may be formed in a bottom surface of the body 210. In forming the groove ring 220 and the groove cut 225 in the body 210 of the disc 200, the lip 215 may be configured to extend away from the body 210 in response to the thermal gradient.

In the illustrated embodiment of the disc 200, the groove ring 220 and groove cut 225 may minimize and/or reduce a thermal mass of the body 210 of the disc 200. For instance, by forming the groove ring 220 and groove cut 225 in the body 210 of the disc 200, thermal mass may be removed in order to minimize thermal mass around the lip 215. In some embodiments, this minimization of thermal mass may direct and/or confine the thermal gradient across the lip 215 rather than, for example, other portions of the body 210. Due to the reduction of thermal mass by the groove ring 220 and/or groove cut 225, thermal deflection in a radial direction (e.g., radially towards the exterior surface 230) of the body 215 may be minimized and/or prevented. The groove cut 225 also reduces the section modulus of the disc at the lip which increases the thermally induced deflection in the axial direction. Thermal deflection, as shown in FIG. 3B, may therefore be confined or directed in the "Z" direction, deflecting the lip 215 substantially axially toward the nozzle (not shown here). By confining and/or directing the thermal deflection of the disc 200 due to the thermal gradient in a substantially axial direction, "Z," the lip 215 may be urged into contact with the nozzle to close or substantially close the PRV 100 against leaks of the fluid 101 from the inlet 110 to the outlet 115.

In some embodiments, all or a portion of the disc 200 may be manufactured from a material with a relatively high coefficient of thermal expansion. For example, in some embodiments, the disc 200 may be made from 316 stainless steel. Alternatively, in other embodiments, the disc 200 may be made from Inconel X-750, or another alloy, such as Incoloy 903, Incoloy 907, Incoloy 909, Inconel X-783, or other alloy(s) suitable for cryogenic applications with a relatively high coefficient of thermal expansion.

FIG. 4 illustrates a sectional view of a disc and a nozzle combination used in one implementation of the PRV 100. As illustrated, disc 200 may be used in combination with a nozzle 300 in the PRV 100 to regulate flow of the fluid 101 from the inlet 110 to the outlet 115 of the PRV 100. In the illustrated embodiment, the nozzle 300 includes a ledge 305 formed at a top surface of the nozzle 300 (i.e., seat 119). The ledge 305 may be formed in the nozzle 300 to protrude radially towards the centerline 10 of the PRV 100 by, for example, formation of a recess in an exterior surface 315 of the nozzle 300 to form a radial notch 310.

In some embodiments of the nozzle 300 including the ledge 305, the thermal gradient between the inlet 110 and the outlet 120 of the PRV 100 may be experienced across the ledge 305. The radial notch 310 may minimize and/or reduce a thermal mass of the nozzle 300 at the seat 119. For instance, by forming the radial notch 310, thermal mass may be removed in order to minimize thermal mass around the ledge 305. In some embodiments, this minimization of thermal mass may direct and/or confine the thermal gradient across the ledge 310 rather than, for example, a full thickness of the seat 119 between the interior surface 315 and an exterior surface 320. Due to the reduction of thermal mass and section modulus by the radial notch 310, thermal deflection in a radial direction (e.g., towards the interior surface 315) of the seat 119 may be minimized and/or prevented. Thermal deflection may therefore be confined to or directed in an axial direction, deflecting the ledge 305 toward the disc 200. By confining and/or directing the thermal deflection of the ledge 305 due to the thermal gradient in an axial direction, the ledge 305 may be urged into contact with the disc 200 to close or substantially close the PRV 100 against leaks of the fluid 101 from the inlet 110 to the outlet 115.

In some embodiments, the nozzle 300 may be manufactured from a material with a relatively high coefficient of thermal expansion. For example, in some embodiments, the nozzle 300 may be made from 316 stainless steel. Alternatively, in other embodiments, the nozzle 300 may be made from Inconel X-750, or another alloy, such as Incoloy 903, Incoloy 907, Incoloy 909, Inconel X-783, or other alloy(s) suitable for cryogenic application with a relatively high coefficient of thermal expansion.

Figure 5A:
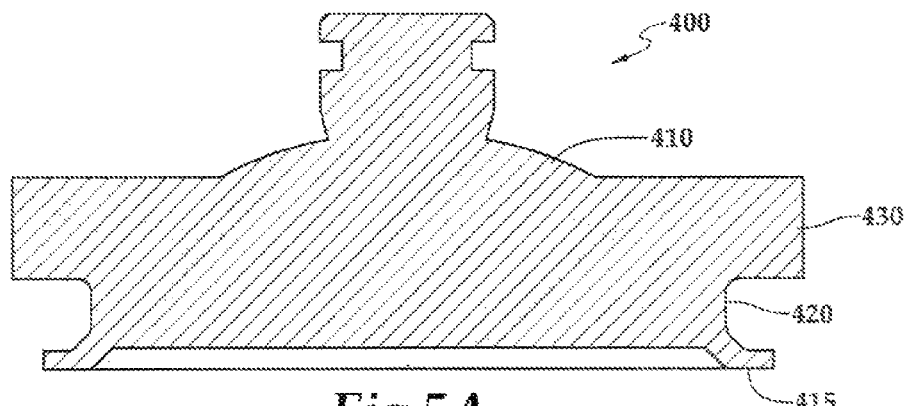
FIGS. 5A and 5B illustrate a cross-sectional view of another embodiment of a disc used in one implementation of a PRV in accordance with the present disclosure.
Figure 5B:
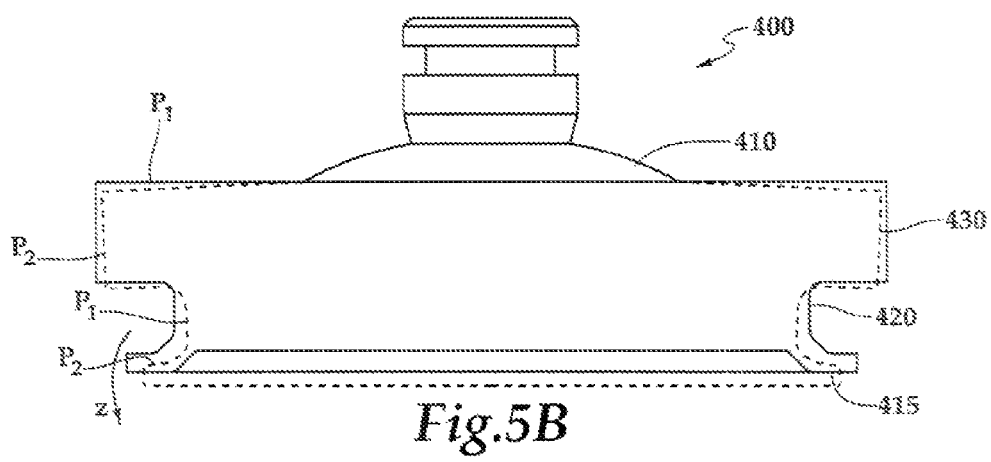
Figure 6:
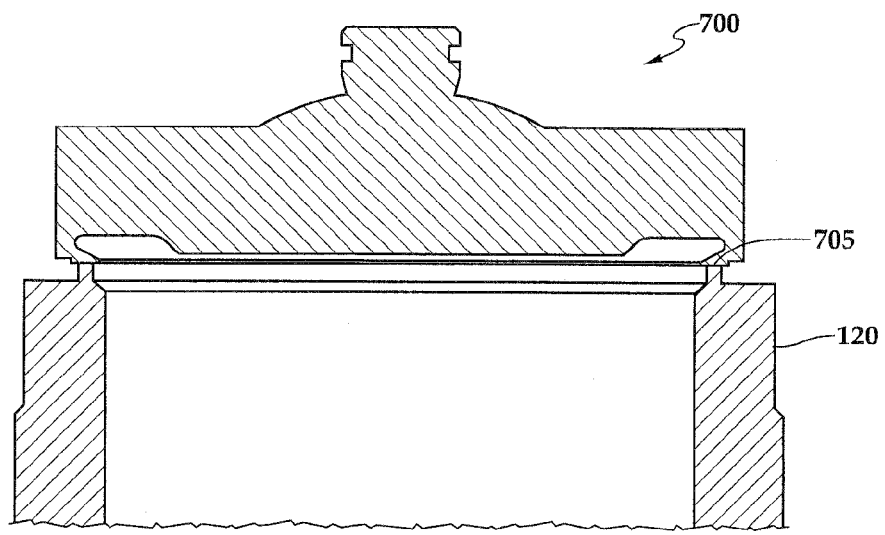
FIG. 6 illustrates an enlarged sectional view of prior art thermodisc and a nozzle combination used in a PRV for a high temperature fluid (e.g., steam) service.
Figure 7A:
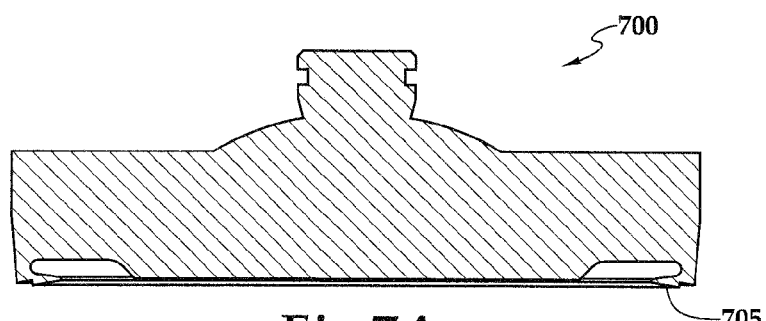
FIGS. 7A and 7B illustrate a prior art thermodisc used in the PRV of FIGS. 1A, 1B and 1C for a high temperature fluid (e.g., steam) service.
Figure 7B:
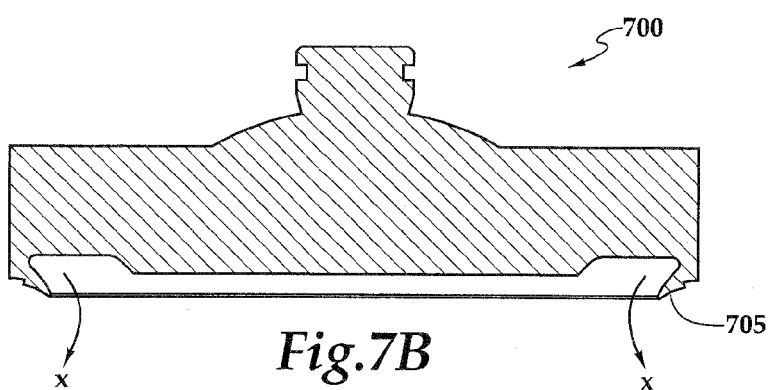

FIGS. 5A and 5B illustrate a sectional view of a disc 400 that may be used in the PRV 100 of the present disclosure. The disc 400 has a body 410, a lip 415, and a groove ring 420. As shown particularly in FIG. 5B, in some embodiments, at least a portion of the disc 400 may axially deflect in the illustrated direction "Z" in response to a thermal gradient across the lip 415. For example, when the disc 400 is utilized in the PRV 100 during cryogenic service, a thermal gradient between the inlet 110 and the outlet 120 of the PRV 100 may be experienced across the lip 415 of the disc 400. The thermal gradient may, in some embodiments, be a difference between a temperature of the fluid 101 at the inlet 110 of the PRV and an ambient temperature at the outlet 115 of the PRV. As illustrated in FIG. 5B, position $P_1$ illustrates the configuration of an embodiment of the disc 400 when not deflected due to a thermal gradient. Position $P_2$ illustrates a deflected position due to a thermal gradient across the disc 400. Dotted lines illustrate the approximated deflected position $P_2$. The amount of deflection will vary depending on the thermal gradient and the configuration of the disc 400.

In the illustrated embodiment, the groove ring 420 may be a circumferential recess in the body 410 around an exterior, radial surface 430 of the disc 400. As compared to the disc 200 (shown in FIG. 3A), the disc 400 may not have a groove cut formed in a bottom surface of the disc 400. In forming the groove ring 420 in the body 410 of the disc 400, the lip 415 may be formed to deflect away from the body 410 in response to the thermal gradient.

In the illustrated embodiment of the disc 400, the groove ring 420 may minimize and/or reduce a thermal mass of the body 410 of the disc 400. For instance, by forming the groove ring 420 in the body 410 of the disc 400, thermal mass may be removed in order to minimize thermal mass around the lip 415. In some embodiments, this minimization of thermal mass may direct and/or confine the thermal gradient across the lip 415 rather than, for example, other portions of the body 410 (e.g., the full radial thickness of the body 410). Due to the reduction of thermal mass by the groove ring 420, thermal deflection in a radial direction (e.g., radially towards the exterior surface 430) of the body 415 may be minimized and/or prevented. Thermal deflection, as shown in FIG. 5B, may therefore be confined or directed in the "Z" direction, deflecting the lip 415 substantially axially toward the nozzle (not shown here). By confining and/or directing the thermal deflection of the disc 400 due to the thermal gradient in a substantially axial direction, "Z," the lip 415 may be urged into contact with the nozzle to close or substantially close the PRV 100 against leaks of the fluid 101 from the inlet 110 to the outlet 115.

Applicant's test data regarding the disc 200 of FIGS. 3A and 3B as a % improvement over a conventional prior art disc is summarized below:

TABLE 1

Test fluid: Liquid Nitrogen: Fluid Temperature: −305 F. to −285 F.

| | Standard Trim | | | Cryogenic Trim | | | |
| --- | --- | --- | --- | --- | --- | --- | --- |
| | Set Pressure | Leak stop | % set pressure | Set pressure | Leak stop | % set pressure | % improvement |
| 1900J | 97.1 | 38.6 | 39.7% | 95 | 76.4 | 79.8% | 201% |
| 1900F | 107 | 39.6 | 37.0% | 108 | 75.4 | 69.8% | 189% |

The percentage improvement is calculated as the improvement in the leak pressure/set pressure ratio of the cryogenic trim over the standard trim.

Various embodiments of the PRV 100 may include varying disc-nozzle combinations. For example, the disc 200 may be combined with the nozzle 300 as shown in FIG. 4. Further, the disc 400 may be combined with the nozzle 300. As another example, the disc 200 may be combined with a conventional nozzle, such as the nozzle 120, which, in some embodiments, may not include the radial notch 310 and/or ledge 305. As another example, the disc 400 may be combined with the nozzle 120. As yet another example, the nozzle 300 may be combined with a conventional disc, which may not include a groove cut, a groove ring, or a lip as those components of the disc are illustrated in the present disclosure.

Different combinations may provide for varying operation of the PRV 100. For instance, combining the disc 200 with the nozzle 300 may provide for maximal sealing contact between the lip 215 and the ledge 305, as axial thermal deflection due to a thermal gradient across the lip 215 and ledge 305 may urge the disc 200 and nozzle 300 into sealing contact. Accordingly, the present disclosure contemplates many different embodiments with varying combinations of the disc, nozzle, and other components of the PRV depending on, for example, a temperature of the fluid 101 and/or cryogenic service in which the PRV 100 is used.

A number of implementations have been described. Nevertheless, it will be understood that various modifications may be made. For example, the recess of the groove ring 220 and/or 420 in an outer surface of the disc 200 and/or 420 may have a cross sectional profile that is hemispherical, square, or v-shaped. Accordingly, other implementations are within the scope of the following claims.

What is claimed is:

1. A pressure relief valve for cryogenic service, comprising:
    a base having a fluid inlet and a fluid outlet;
    a bonnet attached to the base, the base and the bonnet defining an internal cavity in fluid communication with the fluid inlet and the fluid outlet;
    a nozzle disposed within the fluid inlet and attached to the base, the nozzle having a substantially annular seat;
    a disc holder disposed in the internal cavity; and
    a closure disc disposed within a proximal end of the disc holder, the closure disc comprising a substantially cylindrical body having an upper portion adapted to be received in the distal end of the disc holder and a lower portion, the lower portion including a groove formed on an exterior radial surface of the cylindrical body and an outwardly disposed lip having an upper surface comprising a portion of an interior surface of the groove and a lower closure surface proximate the annular seat of the nozzle,
    wherein the lip of the closure disc is adapted to cause the lower closure surface to deflect downwardly and radially inwardly relative to the annular seat in response to a cryogenic thermal gradient applied across the lip,
    wherein said cryogenic thermal gradient created by a cryogenic temperature fluid flowing between the lower closure surface of the lip and the annular seat of the nozzle, and
    wherein, when subjected to the cryogenic thermal gradient the downwardly and radially inwardly deflection of the lower closure surface places the lower closure surface in contact with the annular seat of nozzle and substantially closes the valve.

2. The valve of claim 1, wherein the disc further comprises a recess formed in a lower surface of the cylindrical body concentric with the exterior surface of the body.

3. The valve of claim 1, wherein the nozzle further comprises:
    a nozzle groove radially formed on an exterior cylindrical surface of the nozzle; and
    an outwardly disposed ledge having a lower ledge surface comprising a portion of an exterior surface of the nozzle groove and an upper ledge surface comprising the seat of the nozzle,
    wherein when subjected to the cryogenic thermal gradient the lower closure surface of the upwardly and inwardly deflected lip contacts the upper ledge surface of nozzle and substantially closes the valve.

4. The valve of claim 1, wherein the temperature of the fluid at the fluid inlet is between approximately −21° F. and approximately −75° F.

5. The valve of claim 1, wherein the temperature of the fluid at the fluid inlet is between approximately −76° F. and approximately −150° F.

6. The valve of claim 1, wherein the temperature of the fluid at the fluid inlet is between approximately −151° F. and approximately −450° F.

7. The valve of claim 1, wherein the temperature of the fluid at the fluid inlet is between approximately 0° F. and approximately −50° F.

8. The valve of claim 1, wherein the disc comprises a material selected from the group consisting of 316 stainless steel, Inconel X-750, Incoloy 903, Incoloy 907, Incoloy 909, and Inconel X-783.

9. The valve of claim 1, wherein the closure disc is removably attached to the disc holder.

10. A pressure relief valve for cryogenic service, comprising:
    a base having a fluid inlet and a fluid outlet;
    a bonnet attached to the base, the base and the bonnet defining an internal cavity in fluid communication with the fluid inlet and the fluid outlet;
    a nozzle disposed within the fluid inlet and attached to the base, the nozzle including a nozzle groove radially formed on an exterior cylindrical surface of the nozzle, an outwardly disposed ledge having a lower ledge surface comprising a portion of an interior surface of the nozzle groove, and an upper ledge surface forming an annular seat of the nozzle;
    a disc holder disposed in the internal cavity; and
    a closure disc disposed within a proximal end of the disc holder, the closure disc comprising a substantially cylindrical body having an upper portion adapted to be received in the distal end of the disc holder and a lower portion having a lower closure surface,
    wherein the ledge of the nozzle is adapted to cause the annular seat to deflect upwardly and radially inwardly in response to a cryogenic thermal gradient applied across the ledge,
    wherein said cryogenic gradient created by a cryogenic temperature fluid flowing between the lower closure surface of the disc and the annular seat of the nozzle, and
    wherein, when subjected to the cryogenic thermal gradient, the upwardly and radially inwardly deflection of the annular seat places the annular seat in contact with the lower closure surface and substantially closes the valve.

11. The valve of claim 10, wherein the disc further comprises a recess formed in a lower surface of the cylindrical body concentric with the exterior surface of body.

12. The valve of claim 10, wherein the temperature of the fluid at the fluid inlet is between approximately −21° F. and approximately −75° F.

13. The valve of claim 10, wherein the temperature of the fluid at the fluid inlet is between approximately −76° F. and approximately −150° F.

14. The valve of claim 10, wherein the temperature of the fluid at the fluid inlet is between approximately −151° F. and approximately −450° F.

15. The valve of claim 10, wherein the temperature of the fluid at the fluid inlet is between approximately 0° F. and approximately −50° F.

16. The valve of claim 10, wherein the nozzle comprises a material selected from the group consisting of 316 stainless steel, Inconel X-750, Incoloy 903, Incoloy 907, Incoloy 909, and Inconel X-783.

17. The valve of claim 10, wherein the nozzle is removably attached to the base.

18. The valve of claim 10, wherein the nozzle is integral with the base.

19. A pressure relief valve for cryogenic service, comprising:
   a base having a fluid inlet and a fluid outlet;
   a bonnet attached to the base, the base and the bonnet defining an internal cavity in fluid communication with the fluid inlet and the fluid outlet;
   a nozzle disposed within the fluid inlet and attached to the base, the nozzle including a nozzle groove radially formed on an exterior cylindrical surface of the nozzle, an outwardly disposed ledge having a lower ledge surface comprising a portion of an exterior surface of the nozzle groove, and an upper ledge surface forming an annular seat of the nozzle, wherein the ledge of the nozzle is adapted to cause the annular seat to deflect upwardly and radially inwardly in response to a cryogenic thermal gradient applied across the ledge, said cryogenic gradient created by a cryogenic temperature fluid flowing between the lower closure surface of the disc and the annular seat of the nozzle;
   a disc holder disposed in the internal cavity;
   a closure disc disposed within a proximal end of the disc holder, the closure disc comprising a substantially cylindrical body having an upper portion adapted to be received in the distal end of the disc holder and a lower portion, the lower portion including a groove formed on an exterior radial surface of the cylindrical body, and an outwardly disposed lip having an upper surface comprising a portion of an interior surface of the groove and a lower closure surface proximate the annular seat of the nozzle,
   wherein the lip of the closure disc is adapted to cause the lower closure surface to deflect downwardly and radially inwardly relative to the annular seat in response to a cryogenic thermal gradient applied across the lip,
   wherein said cryogenic gradient created by a cryogenic temperature fluid flowing across the lower closure surface of the lip and the annular seat of the nozzle, and
   wherein, when the lip and ledge are subjected to the cryogenic thermal gradient, the downwardly and radially inwardly deflection of the lower closure surface and the upwardly and radially inwardly deflection of the annular seat places the lower closure surface in contact with the annular seat and substantially closes the valve.

20. The valve of claim 19, wherein the disc further comprises a recess formed in a lower surface of the cylindrical body concentric with the exterior surface of the body.

21. The valve of claim 19, wherein the temperature of the fluid at the fluid inlet is between approximately $-21°$ F. and approximately $-75°$ F.

22. The valve of claim 19, wherein the temperature of the fluid at the fluid inlet is between approximately $-76°$ F. and approximately $-150°$ F.

23. The valve of claim 19, wherein the temperature of the fluid at the fluid inlet is between approximately $-151°$ F. and approximately $-450°$ F.

24. The valve of claim 19, wherein the temperature of the fluid at the fluid inlet is between approximately $0°$ F. and approximately $-50°$ F.

25. A method for regulating a cryogenic process fluid, comprising:
   providing a pressure relief valve having:
      a base having a fluid inlet and a fluid outlet;
      a bonnet attached to the base, the base and the bonnet defining an internal cavity in fluid communication with the fluid inlet and the fluid outlet;
      a nozzle disposed within the fluid inlet and attached to the base, the nozzle having a substantially annular seat;
      a disc holder disposed in the internal cavity; and
      a closure disc disposed within a proximal end of the disc holder, the closure disc comprising a substantially cylindrical body having an upper portion adapted to be received in the distal end of the disc holder and a lower portion, the lower portion including a groove formed on an exterior radial surface of the cylindrical body and an outwardly disposed lip having an upper surface comprising a portion of an interior surface of the groove and a lower closure surface proximate the annular seat of the nozzle;
   exposing the fluid outlet to an ambient temperature;
   providing a cryogenic process fluid to the fluid inlet and through the nozzle, the cryogenic process fluid having a bulk temperature significantly less than the ambient temperature;
   opening the valve to allow fluid communication of the cryogenic process fluid from the fluid inlet to the fluid outlet; and
   closing the valve to prevent or substantially prevent fluid communication of the cryogenic process fluid from the fluid inlet to the fluid outlet,
   wherein the lip of the closure disc is adapted to cause the lower closure surface to deflect downwardly and radially inwardly relative to the annular seat in response to a cryogenic thermal gradient applied across the lip,
   wherein said cryogenic thermal gradient created by a cryogenic temperature fluid flowing between the lower closure surface of the lip and the annular seat of the nozzle, and
   wherein, when subjected to the cryogenic thermal gradient, the downwardly and radially inwardly deflection of the lower closure surface places the lower closure surface in contact with the annular seat and substantially closes the valve.

26. The method of claim 25, wherein the temperature of the fluid at the fluid inlet is between approximately $-21°$ F. and approximately $-75°$ F.

27. The method of claim 25, wherein the temperature of the fluid at the fluid inlet is between approximately $-76°$ F. and approximately $-150°$ F.

28. The method of claim 25, wherein the temperature of the fluid at the fluid inlet is between approximately $-151°$ F. and approximately $-450°$ F.

29. The method of claim 25, wherein the temperature of the fluid at the fluid inlet is between approximately $0°$ F. and approximately $-50°$ F.

30. A method for regulating a cryogenic process fluid, comprising:
   providing a pressure relief valve having:
      a base having a fluid inlet and a fluid outlet;
      a bonnet attached to the base, the base and the bonnet defining an internal cavity in fluid communication with the fluid inlet and the fluid outlet;
      a nozzle disposed within the fluid inlet and attached to the base, the nozzle including a nozzle groove radially formed on an exterior cylindrical surface of the nozzle, an outwardly disposed ledge having a lower ledge surface comprising a portion of an interior surface of the nozzle groove, and an upper ledge surface forming an annular seat of the nozzle;

a disc holder disposed in the internal cavity;

a closure disc disposed within a proximal end of the disc holder, the closure disc comprising a substantially cylindrical body having an upper part adapted to be received in the distal end of the disc holder and a lower portion having a lower closure surface;

exposing the fluid outlet to an ambient temperature;

providing a cryogenic process fluid to the fluid inlet and through the nozzle, the cryogenic process fluid having a bulk temperature significantly less than the ambient temperature;

opening the valve to allow fluid communication of the cryogenic process fluid from the fluid inlet to the fluid outlet; and closing the valve to prevent or substantially prevent fluid communication of the cryogenic process fluid from the fluid inlet to the fluid outlet, wherein the ledge of the nozzle is adapted to cause the annular seat to deflect upwardly and radially inwardly in response to a cryogenic thermal gradient applied across the ledge, wherein said cryogenic gradient created by a cryogenic temperature fluid flowing between the lower closure surface of the disc and the annular seat of the nozzle, and wherein, when subjected to the cryogenic thermal gradient, the upwardly and radially inwardly deflection of the annular seat places the annular seat in contact with the lower closure surface and substantially closes the valve.

31. The method of claim 30, wherein the temperature of the fluid at the fluid inlet is between approximately −21° F. and approximately −75° F.

32. The method of claim 30, wherein the temperature of the fluid at the fluid inlet is between approximately −76° F. and approximately −150° F.

33. The method of claim 30, wherein the temperature of the fluid at the fluid inlet is between approximately −151° F. and approximately −450° F.

34. The method of claim 30, wherein the temperature of the fluid at the fluid inlet is between approximately 0° F. and approximately −50° F.

35. A method for regulating a cryogenic process fluid, comprising:

providing a pressure relief valve having:

a base having a fluid inlet and a fluid outlet;

a bonnet attached to the base, the base and the bonnet defining an internal cavity in fluid communication with the fluid inlet and the fluid outlet;

a nozzle disposed within the fluid inlet and attached to the base, the nozzle having a substantially annular seat, a nozzle groove radially formed on an exterior cylindrical surface of the nozzle, and an outwardly disposed ledge having a lower ledge surface comprising a portion of an exterior surface of the nozzle groove and an upper ledge surface comprising the seat of the nozzle, wherein the ledge of the nozzle is adapted to cause the annular seat to deflect upwardly and radially inwardly in response to a cryogenic thermal gradient applied across the ledge, a disc holder disposed in the internal cavity;

a closure disc disposed within a proximal end of the disc holder, the closure disc comprising a substantially cylindrical body having an upper portion adapted to be received in the distal end of the disc holder and a lower portion, the lower portion including a groove formed on an exterior radial surface of the cylindrical body and an outwardly disposed lip having an upper surface comprising a portion of an interior surface of the groove and a lower closure surface proximate the annular seat of the nozzle, wherein the lip of the closure disc is adapted to cause the lower closure surface to deflect downwardly and radially inwardly relative to the annular seat in response to a cryogenic thermal gradient applied across the lip;

exposing the fluid outlet to an ambient temperature;

providing a cryogenic process fluid to the fluid inlet and through the nozzle, the cryogenic process fluid having a bulk temperature significantly less than the ambient temperature;

opening the valve to allow fluid communication of the cryogenic process fluid from the fluid inlet to the fluid outlet;

creating a cryogenic thermal gradient in the lip and ledge by flowing cryogenic process fluid between the lower closure surface of the lip and the upper ledge surface of the nozzle; and closing the valve to prevent or substantially prevent fluid communication of the cryogenic process fluid from the fluid inlet to the fluid outlet, wherein, when the lip and ledge are subjected to the cryogenic thermal gradient, the downwardly and radially inwardly deflection of the lower closure surface and the upwardly and radially inwardly deflection of the annular seat places the lower closure surface in contact with the annular seat and substantially closes the valve.

* * * * *

UNITED STATES PATENT AND TRADEMARK OFFICE
CERTIFICATE OF CORRECTION

| | | |
|---|---|---|
| PATENT NO. | : 8,505,572 B2 | Page 1 of 1 |
| APPLICATION NO. | : 12/981028 | |
| DATED | : August 13, 2013 | |
| INVENTOR(S) | : Krithivasan | |

It is certified that error appears in the above-identified patent and that said Letters Patent is hereby corrected as shown below:

In the Specification

In Column 2, Line 56, delete "In sonic" and insert -- In some --, therefor.

In Column 6, Line 21, delete "disc 300" and insert -- disc 200 --, therefor.

In Column 6, Line 30, delete "outlet 120" and insert -- outlet 115 --, therefor.

In Column 6, Line 61, delete "body 215" and insert -- body 210 --, therefor.

In Column 7, Line 28, delete "outlet 120" and insert -- outlet 115 --, therefor.

In Column 7, Line 65, delete "outlet 120" and insert -- outlet 115 --, therefor.

In the Claims

In Column 9, Line 48, in Claim 1, delete "gradient" and insert -- gradient, --, therefor.

In Column 11, Line 33, in Claim 19, delete "body," and insert -- body --, therefor.

Signed and Sealed this
First Day of September, 2015

Michelle K. Lee
*Director of the United States Patent and Trademark Office*